US011538024B2

(12) United States Patent
Pearson et al.

(10) Patent No.: US 11,538,024 B2
(45) Date of Patent: Dec. 27, 2022

(54) AUTOMATICALLY COMMUNICATING USER DEVICE DATA TO A TRANSACTION COMPUTING SYSTEM

(71) Applicant: Google LLC, Mountain View, CA (US)

(72) Inventors: Joseph B. Pearson, Cedar Park, TX (US); Krishna Doddamane, Allen, TX (US)

(73) Assignee: GOOGLE LLC, Mountain View, CA (US)

(*) Notice: Subject to any disclaimer, the term of this patent is extended or adjusted under 35 U.S.C. 154(b) by 156 days.

(21) Appl. No.: 16/920,882

(22) Filed: Jul. 6, 2020

(65) Prior Publication Data
US 2020/0334666 A1 Oct. 22, 2020

Related U.S. Application Data

(62) Division of application No. 14/945,275, filed on Nov. 18, 2015, now Pat. No. 10,706,411.
(Continued)

(51) Int. Cl.
G06Q 20/36 (2012.01)
G06Q 20/32 (2012.01)
(Continued)

(52) U.S. Cl.
CPC ........... *G06Q 20/363* (2013.01); *G06Q 20/02* (2013.01); *G06Q 20/202* (2013.01);
(Continued)

(58) Field of Classification Search
CPC .... G06Q 20/363; G06Q 20/02; G06Q 20/202; G06Q 20/327; G06Q 20/3278;
(Continued)

(56) References Cited

U.S. PATENT DOCUMENTS 8,626,592 B2 * 1/2014 Simakov ............ G06Q 20/4037
705/16
8,639,621 B1 * 1/2014 Ellis ................... G06Q 30/0267
705/41
(Continued)

FOREIGN PATENT DOCUMENTS

WO WO2010144651 12/2010
WO WO2013170102 11/2013
(Continued)

OTHER PUBLICATIONS

Ewing et al.: The keys to driving broad consumer adoption of digital wallet and mobile payments, Jan. 1, 2014, McKinsey & Company, pp. 1-8 (Year: 2014).*
(Continued)

*Primary Examiner* — Bijendra K Shrestha
(74) *Attorney, Agent, or Firm* — Dority & Manning, P.A.

(57) ABSTRACT

Automatically communicating information related to a user computing device from a central computing system to a transaction computing system prior to initiation of a transaction between the user computing device and the transaction computing system comprises a digital wallet application and a central computing system. A digital wallet application receives a beacon signal from a transaction computing system indicating the specific identification of the terminal with which the user intends to conduct a transaction. The user computing device communicates the terminal identification to the central computing system. The central computing system communicates customer data, such as loyalty information and offers, to the transaction computing system associated with the terminal. The transaction computing system communicates the customer data to the terminal. When the user taps the user computing device to initiate the
(Continued)

transaction, the terminal provides any benefits associated with the customer data.

16 Claims, 5 Drawing Sheets

Related U.S. Application Data

(60) Provisional application No. 62/081,339, filed on Nov. 18, 2014.

(51) Int. Cl.
*H04W 40/24* (2009.01)
*G06Q 30/02* (2012.01)
*G06Q 20/20* (2012.01)
*G06Q 20/38* (2012.01)
*G06Q 20/02* (2012.01)

(52) U.S. Cl.
CPC ....... *G06Q 20/327* (2013.01); *G06Q 20/3278* (2013.01); *G06Q 20/36* (2013.01); *G06Q 20/387* (2013.01); *G06Q 30/0226* (2013.01); *G06Q 30/0253* (2013.01); *H04W 40/244* (2013.01)

(58) Field of Classification Search
CPC .. G06Q 20/36; G06Q 20/387; G06Q 30/0226; G06Q 30/0253; H04W 40/244
See application file for complete search history.

(56) References Cited

U.S. PATENT DOCUMENTS

| | | | | |
|---|---|---|---|---|
| 9,355,391 | B2* | 5/2016 | von Behren | G06Q 20/047 |
| 2010/0088149 | A1* | 4/2010 | Sullivan | G06Q 30/06 |
| | | | | 705/16 |
| 2012/0284193 | A1* | 11/2012 | Bharghavan | H04L 9/3263 |
| | | | | 705/16 |
| 2013/0144702 | A1 | 6/2013 | Tabor et al. | |
| 2013/0173372 | A1* | 7/2013 | Misra | G06K 7/10722 |
| | | | | 705/14.23 |
| 2013/0246258 | A1* | 9/2013 | Dessert | G06Q 20/351 |
| | | | | 705/16 |
| 2013/0267176 | A1* | 10/2013 | Hertel | G06Q 20/204 |
| | | | | 455/509 |
| 2013/0304553 | A1* | 11/2013 | Hertel | G06Q 30/0238 |
| | | | | 705/14.23 |
| 2014/0012704 | A1* | 1/2014 | Mizhen | G06Q 20/36 |
| | | | | 705/26.41 |
| 2015/0112870 | A1 | 4/2015 | Nagasundaram et al. | |
| 2015/0120472 | A1* | 4/2015 | Aabye | G06Q 20/36 |
| | | | | 705/16 |
| 2016/0012429 | A1* | 1/2016 | Stanoszek | G06Q 20/202 |
| | | | | 705/21 |
| 2016/0094952 | A1* | 3/2016 | Mosher | G06Q 20/202 |
| | | | | 455/456.1 |
| 2016/0132875 | A1* | 5/2016 | Blanco | G06Q 20/047 |
| | | | | 705/44 |
| 2017/0178104 | A1* | 6/2017 | Fernandez | G06Q 30/0281 |

FOREIGN PATENT DOCUMENTS

| | | | | |
|---|---|---|---|---|
| WO | WO-2014093993 | A1* | 6/2014 | ........... G06Q 20/325 |
| WO | WO2016081648 | | 5/2016 | |

OTHER PUBLICATIONS

Ewing, Dan: The keys to driving consumer adoption of digital wallets and mobile payments, Jan. 1, 2014, McKinsey & Company, pp. 1-8 (Year: 2014).*

Accenture, Everyday Payments: How digital is Revolutionizing Payments in the Everyday Bank Ecosystem, Jul. 27, 2014, Accenture Payment Services, pp. 1-14.

International Search Report and Written Opinion issued in International Application No. PCT/US2015/061413, dated Feb. 9, 2016, 10 pages.

Horat, European Office Action issued in European Application No. 1580164 7.7, dated May 4, 2018, 10 pages.

NASDAQ OMX, "SK Planet Launches Slyde: First Beacon-Enabled, All-in-One Mobile App to Combine Loyalty Programs", Deals and Touchless Pay, Jul. 10, 2014, NASDAQ OMX GlobalNewswire.

NASDAQ OMX, "epay Partners With Appflare to Launch Beacon Network", Aug. 5, 2014, NASDAQ OMX Global Newswire.

International Preliminary Report on Patentability issued in International Application No. PCT/US2015/061413, dated Jun. 1, 2017, 9 pages.

* cited by examiner

AUTOMATICALLY COMMUNICATING USER DEVICE DATA TO A TRANSACTION COMPUTING SYSTEM

RELATED APPLICATIONS

This application is a Continuation of and claims priority to U.S. patent application Ser. No. 14/945,275, filed of Nov. 18, 2015 and entitled Automatically Communicating User Device Data to a Transaction Computing System," which claims priority under 35 U.S.C. § 119 to U.S. Patent Application No. 62/081,339 filed Nov. 18, 2014 and entitled "Systems, Methods, and Computer Program Products for Managing Contactless Communication Data." The entire contents of the above-identified applications are hereby fully incorporated herein by reference.

TECHNICAL FIELD

The present disclosure relates to automatically communicating information related to a user computing device from a central computing system to a transaction computing system prior to initiation of a transaction between the user computing device and the transaction computing system.

BACKGROUND

A user computing device can communicate with a point of sale ("POS") terminal via near field communication ("NFC"), BLUETOOTH, barcode, Wi-Fi, infrared, or any other suitable communication technology. A transaction can be initiated by a "tap," swipe, or other motion of the user computing device or via a feature selection from the user. The user computing device can host a transaction application, such as a digital wallet application, that can be used to communicate with the POS terminal and to provide the digital wallet information.

To conduct a transaction, the POS terminal can obtain the information from the user computing device. The point of sale terminal can submit the transaction details and the digital wallet information to a card network to receive payment from a card issuer associated with the digital wallet information.

Users may maintain loyalty accounts with merchant systems and receive and store offers and other data from the merchant systems, manufacturers, and others. The loyalty systems may be managed by the merchant system, a digital wallet system, or a third party loyalty management system. In conventional systems, to receive loyalty benefits or to redeem offers, the user may be required to provide a loyalty card, present offer data, provide a loyalty account number on a keypad of the POS terminal, or perform other required actions. In alternate conventional systems, the user computing device may transmit the loyalty accounts, offers, and other customer data to the POS terminal to receive all of the benefits of the user accounts, such as discounts.

SUMMARY

Techniques herein provide computer-implemented methods to transmit customer data to point of sale terminals. Transmitting customer data comprises a digital wallet system employing a server configured to manage a digital wallet account for a user and a user computing device employing a digital wallet application. The user computing device receives a beacon signal from a point of sale terminal associated with a merchant system and extracts an identification of the point of sale terminal from the beacon signal. The user computing device communicates the identification of the point of sale terminal and the customer identification to the digital wallet system and initiates a wireless communication with the point of sale terminal. The digital wallet system provides customer data associated with the customer identification, such as loyalty data or offer data, to the point of sale terminal to be used in a subsequent transaction. The user computing device provides the customer identification to the point of sale terminal and receives a notification that the transaction has been completed.

In certain other example aspects described herein, systems and computer program products to transmit customer data to point of sale terminals are provided.

These and other aspects, objects, features and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
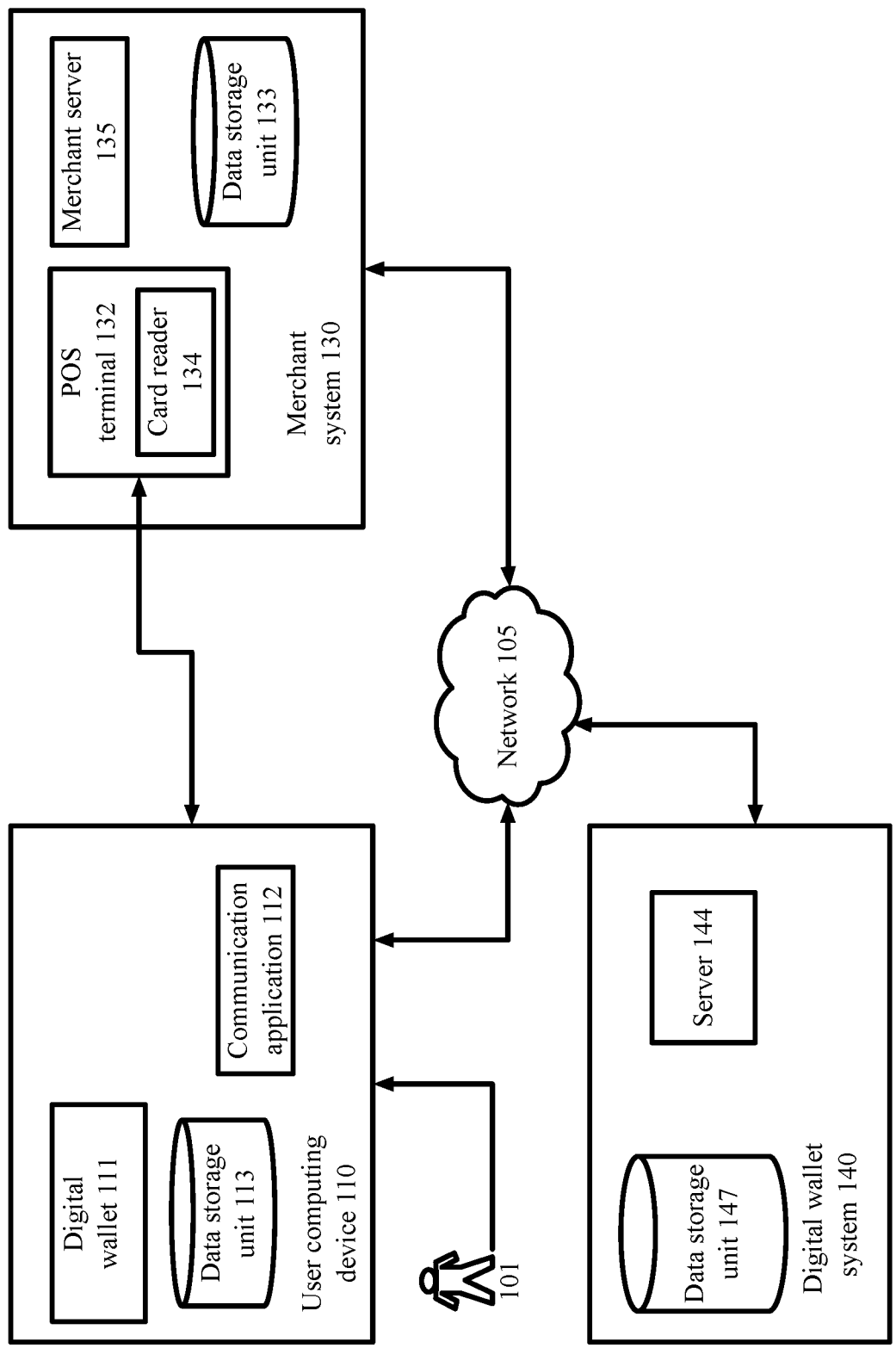
FIG. 1 is a block diagram depicting a system to provide customer data to a point of sale terminal, in accordance with certain example embodiments.

In an example embodiment, a user computing device receives a beacon signal from a point of sale ("POS") terminal at a merchant system indicating the specific identification ("ID") of the POS terminal with which the user intends to conduct a transaction. The user computing device communicates the POS terminal ID to a digital wallet system. The digital wallet system communicates customer data, such as loyalty information and offers, to the merchant system server associated with the POS terminal. The merchant system server communicates the customer data to the POS terminal. When the user taps the user computing device with the POS terminal to initiate the transaction, the POS terminal provides any benefits associated with the customer data, such as loyalty benefits or offers for application to the transaction.

In an example embodiment, a digital wallet system or other system manages a digital wallet account for a user. As used herein, the digital wallet system represents any suitable digital wallet account manager, such as a credit card issuer, a payment processing system, a banking institution, a user computing device manufacturer, or any other suitable system. The user associates one or more payment accounts with the digital wallet account. The payment accounts may be credit card accounts, debit accounts, bank accounts, stored value accounts, or any other suitable payment accounts.

The digital wallet system associates a customer identification ("ID") with the user account. In an example, the customer ID allows any system to identify the digital wallet account of the user on the digital wallet system. The customer ID may allow a requestor to identify loyalty data of the user, offers associated with the digital wallet account, or any other data associated with the user digital wallet account that the user allows to be shared.

The POS terminal at a merchant system location employs an associated beacon signal. The beacon signal may be any wireless broadcast of the identification of the POS terminal and the merchant system. For example, the beacon signal may be any suitable technology that can be detected and understood by the user computing device, such as near field communication ("NFC"), Bluetooth, Wi-Fi, Infrared, or any other suitable beacon signal technology. The beacon signal provides the appropriate information about the POS terminal and the merchant system to the user computing device.

In an alternate example, the POS terminal data may be obtained by the user computing device from a barcode, a QR code, or other machine readable code. In this example, the user employs a camera or other module on the user computing device to read a code that identifies the POS terminal. In another example, the user computing device must tap the POS terminal, beacon, or an associated device to initiate the communication and to receive the POS terminal data.

When a user approaches the POS terminal to conduct a transaction, the user computing device detects the beacon signal being transmitted from the POS terminal or associated beacon device. The beacon signal provides the POS terminal ID, the merchant system with which the POS terminal is associated, the location of the POS terminal, or any other suitable data. The user computing device communicates the POS terminal data to the digital wallet system associated with the user digital wallet account. The user computing device may use any suitable communication technology to transmit the POS terminal data, such as an Internet connection over the network, a cellular connection, Wi-Fi, email, text, or any other suitable communication technology.

In an example, when the beacon signal is detected, the digital wallet application on the user computing device opens on the user interface of the user computing device. The digital wallet application provides an indication to the user that the beacon signal has been received and asks if the user would like to proceed. If the user elects to conduct the transaction with the identified POS terminal using the customer ID, then the user actuates a button control or other object to instruct the digital wallet application to proceed. In an alternate embodiment, the user may configure the user computing device to communicate the POS terminal data to the digital wallet system without an authorization from the user for each communication.

The digital wallet system receives the POS terminal data, the customer ID, and any other suitable data from the user computing device. The digital wallet system accesses the customer ID data. For example, the digital wallet system accesses the loyalty data and offer data stored in the user account associated with the customer ID. The digital wallet system further identifies data in the user account that is associated with the merchant system associated with the POS terminal ID. For example, if the user has a loyalty account with the merchant system, then the digital wallet system accesses the loyalty account number, offers associated with the loyalty account, or any other suitable data.

The digital wallet system communicates the customer data to the merchant system server. The merchant system server may be a server located at the merchant system or in a remote location that is linked to the POS terminal via the network or in any suitable manner. The merchant system server may represent a customer relationship management ("CRM") system. The merchant system server receives the customer data and communicates the data to the POS terminal at which the user will be conducting the transaction. In an alternate embodiment, the digital wallet system communicates the customer data directly to the POS terminal, such as via an Internet connection over the network.

The user computing device is directed by the user to initiate the transaction with the POS terminal. In an example, the user approaches the POS terminal with one or more items for purchase. The user swipes or taps the user computing device with the digital wallet application and initiates a communication between the user computing device and the POS terminal. The POS terminal may employ a card reader or other hardware or software to communicate wirelessly with the user computing device via NFC or other suitable technology, such as Bluetooth, Wi-Fi, or infrared.

The reader requests payment account information and other suitable data from the user computing device. The user computing device assembles the necessary data for responding to the reader and communicates the data to the reader. The data may include the customer ID, a payment account number of a payment instrument on the digital wallet application, the expiration date of the payment instrument, the name of the user, or other suitable data.

The reader provides the customer ID and associated data to the POS terminal. The POS terminal accesses the customer loyalty data, offers, and other suitable information that was received from the digital wallet system. For example, the POS terminal accesses received and stored customer data associated with the customer ID from a data storage unit. The POS terminal applies any relevant offers or discounts due to the user for the pending transaction.

For example, if the customer data included a 20% discount offer for a particular product that is being purchased by the user, then the POS terminal applies the discount to the pending transaction before requesting an authorization for the transaction. In another example, if the customer data included a loyalty account that provides a 5% discount on all transactions, the POS terminal applies the discount to the pending transaction before requesting an authorization for the transaction using the payment instrument information received from the user computing device. In another example, the POS terminal may communicate the customer ID and a total value of the transaction to the digital wallet account to allow loyalty points to accrue in the user account associated with the customer ID. In another example, the POS terminal logs the transaction of the user so that a "free coffee during $10^{th}$ visit" instance is awarded to the user account associated with the customer ID. Any other suitable action may be taken that supports the account of the user.

After loyalty rewards, offers, and other suitable actions are taken by the POS terminal, the transaction is conducted with a payment processing system. In an example, the POS terminal provides a request for authorization of the transaction through a credit card network associated with the user account on the digital wallet system. The issuer of the selected payment instrument provides an authorization for the transaction. The POS terminal receives the authorization, approves the transaction, and provides a receipt to the user or the user computing device. In an example, the digital wallet system is the payment processing system and/or the account issuer.

In certain examples, the user is not required to use the digital wallet application to conduct the transaction. For example, the user may tap the user computing device to transmit the customer ID, but then elect to pay cash after the POS terminal applies the offer and loyalty data to the transaction. Alternatively, the user may swipe a credit card or other card having a magnetic stripe in the POS terminal reader to provide the customer ID to the POS terminal.

By using and relying on the methods and systems described herein, the digital wallet system of a user dynamically provides offers and loyalty information to a POS terminal to apply to a pending transaction. By providing the beacon signal identifying the POS terminal, the systems and methods described herein may be employed to allow merchant POS terminals to receive the user loyalty and account data from the digital wallet system without requiring the user to provide additional cards, or in any other manner enter a loyalty or other ID or offers. The system is improved for the merchant system in that offers are easily accessed just by communicating the beacon signal and automatically receiving the customer data. The offers are improved for user in that loyalty accounts and offers are applied to transactions with the POS terminal without further actions required of the user. Hence, the methods and systems described herein permit users to obtain the benefits of loyalty accounts, offers, and other data without the need to present additional information and via a single interaction or tap of the user computing device with the POS terminal.

Example System Architectures

Turning now to the drawings, in which like numerals represent like (but not necessarily identical) elements throughout the figures, example embodiments are described in detail.

FIG. 1 is a block diagram depicting a system 100 to provide customer data to a point of sale ("POS") terminal 132, in accordance with certain example embodiments. In some embodiments, a user associated with a device must install an application and/or make a feature selection to obtain the benefits of the techniques described herein.

As depicted in FIG. 1, the system 100 includes network computing devices/systems 110, 130, and 140 that are configured to communicate with one another via one or more networks 105 or via any suitable communication technology.

Each network 105 includes a wired or wireless telecommunication means by which network devices (including devices 110, 130, and 140) can exchange data. For example, each network 105 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data. Throughout the discussion of example embodiments, it should be understood that the terms "data" and "information" are used interchangeably herein to refer to text, images, audio, video, or any other form of information that can exist in a computer-based environment. The communication technology utilized by the devices 110, 130, and 140 may be similar networks to network 105 or an alternative communication technology.

Each network computing device/system 110, 130, and 140 includes a computing device having a communication module capable of transmitting and receiving data over the network 105 or a similar network. For example, each network device 110, 130, and 140 can include a server, desktop computer, laptop computer, tablet computer, a television with one or more processors embedded therein and/or coupled thereto, smart phone, handheld or wearable computer, personal digital assistant ("PDA"), wearable devices such as smart watches or glasses, or any other wired or wireless, processor-driven device. In the example embodiment depicted in FIG. 1, the network devices 110, 130, and 140 are operated by end-users or consumers, merchant system operators, and digital wallet system operators, respectively.

The user 101 can use the communication application 112 on a user computing device 110, which may be, for example, a web browser application or a stand-alone application, to view, download, upload, or otherwise access documents or web pages via a distributed network 105. The communication application 112 can interact with web servers or other computing devices connected to the network 105, including the web server 144 of the digital wallet system 140.

In another example, the communication application 112 communicates with the point of sale ("POS") terminal 132 via near field communication ("NFC") or other wireless communication technology, such as Bluetooth, Wi-Fi, infrared, or any other suitable technology.

The user computing device 110 may include a digital wallet application 111. The digital wallet application 111 may encompass any application, hardware, software, or process the user computing device 110 may employ to assist the user 101 in completing a purchase. The digital wallet application 111 can interact with the communication application 112 or can be embodied as a companion application of the communication application 112. As a companion application, the digital wallet application 111 executes within the communication application 112. That is, the digital wallet application 111 may be an application program embedded in the communication application 112. In certain embodiments a digital wallet of the user 101 may reside in a cloud computing environment, on a merchant server 135, or in any other environment.

The user computing device 110 also includes a data storage unit 113 accessible by the digital wallet application 111 and the communication application 112. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory accounts or removable flash memory. In certain embodiments, the data storage unit 113 may reside in a cloud based computing system.

The digital wallet system 140 may include a data storage unit 147 accessible by the server 144. The example data storage unit 147 can include one or more tangible computer-readable storage devices, or the data storage unit may be a separate system, such as, a different physical or virtual machine, or a cloud-based storage service.

The digital wallet system 140 may be any system that manages, configures, enables, or otherwise services a digital wallet for a user 101. The digital wallet system 140 may provide a mechanism for a user 101 to conduct transactions with a merchant system 130. The digital wallet system 140 may provide software or other applications to a user computing device 110 to conduct digital wallet transactions on the user computing device 110.

The digital wallet system 140 may provide the user 101 with a customer identification ("ID") that identifies the account of the user 101 on the digital wallet system 140. The digital wallet system 140 may utilize the customer ID to access loyalty information of the user 101, stored or associated offers, payment instruments, or other suitable data. The user 101 may utilize one or more payment instruments (not pictured). The payment instrument may be any type of payment card provided by a card issuer, banking institution, merchant system stored value program, or any other suitable system. The payment instrument may be used to fund a transaction conducted by the user 101 with the digital wallet account of the user 101. In certain examples, the digital wallet system 140 also provides the payment instrument.

An example merchant system 130 comprises a server 135, a data storage unit 133, a merchant POS terminal 132, and a card reader 134.

In an example embodiment, the server 135 communicates with the digital wallet system 140 to transmit and receive customer IDs, payment information, loyalty information, offers, and other useful data. The merchant server 135 receives data from the POS terminal 132 and assists in conducting transactions with payment processing systems, card issuers, and other suitable systems. The merchant server 135 may represent a customer relationship management ("CRM") system. The CRM may be any system used by the merchant system 130 to manage, record, and evaluate customer interactions.

In an example embodiment, the data storage unit 133 can include any local or remote data storage structure accessible to the merchant system 130 suitable for storing information. In an example embodiment, the data storage unit 133 stores encrypted information.

In an example embodiment, the merchant POS terminal 132, such as a cash register, is capable of processing a purchase transaction initiated by a user 101. In an example embodiment, the merchant system 130 operates a commercial store and the user 101 indicates a desire to make a purchase by presenting a form of payment at the merchant POS terminal 132. In an example embodiment, the merchant POS terminal 132 is capable of communicating with the user computing device 110 using an NFC, Bluetooth, and/or Wi-Fi communication method. In an example, the POS terminal 132 utilizes a card reader 134 to communicate with a user computing device 110 of the user 101. The card reader may receive data from a magnetic stripe, NFC, or any other suitable payment instrument 115 technology.

It will be appreciated that the network connections shown are examples and other means of establishing a communications link between the computers and devices can be used. Moreover, those having ordinary skill in the art having the benefit of the present disclosure will appreciate that the merchant system 130, digital wallet system 140, and the user computing device 110 illustrated in FIG. 1 can have any of several other suitable computer system configurations. For example, a user computing device 110 embodied as a mobile phone or handheld computer may not include all the components described above.

Figure 5:
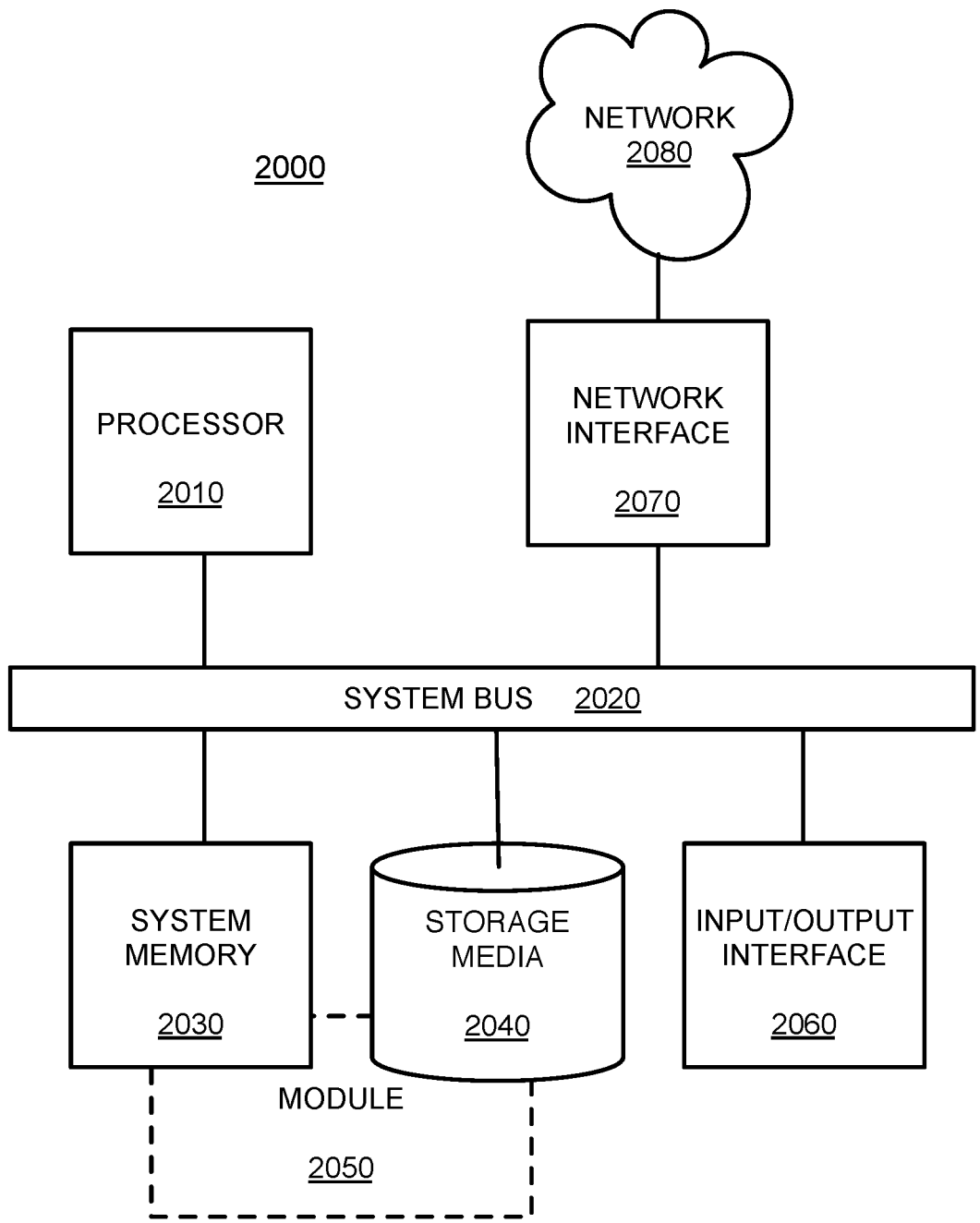
FIG. 5 is a block diagram depicting a computing machine and a module, in accordance with certain example embodiments.

In example embodiments, the network computing devices and any other computing machines associated with the technology presented herein may be any type of computing machine such as, but not limited to, those discussed in more detail with respect to FIG. 5. Furthermore, any functions, applications, or modules associated with any of these computing machines, such as those described herein or any other others (for example, scripts, web content, software, firmware, or hardware) associated with the technology presented herein may by any of the modules discussed in more detail with respect to FIG. 5. The computing machines discussed herein may communicate with one another, as well as with other computing machines or communication systems over one or more networks, such as network 105. The network 105 may include any type of data or communications network, including any of the network technology discussed with respect to FIG. 5.

Example Processes

Figure 2:
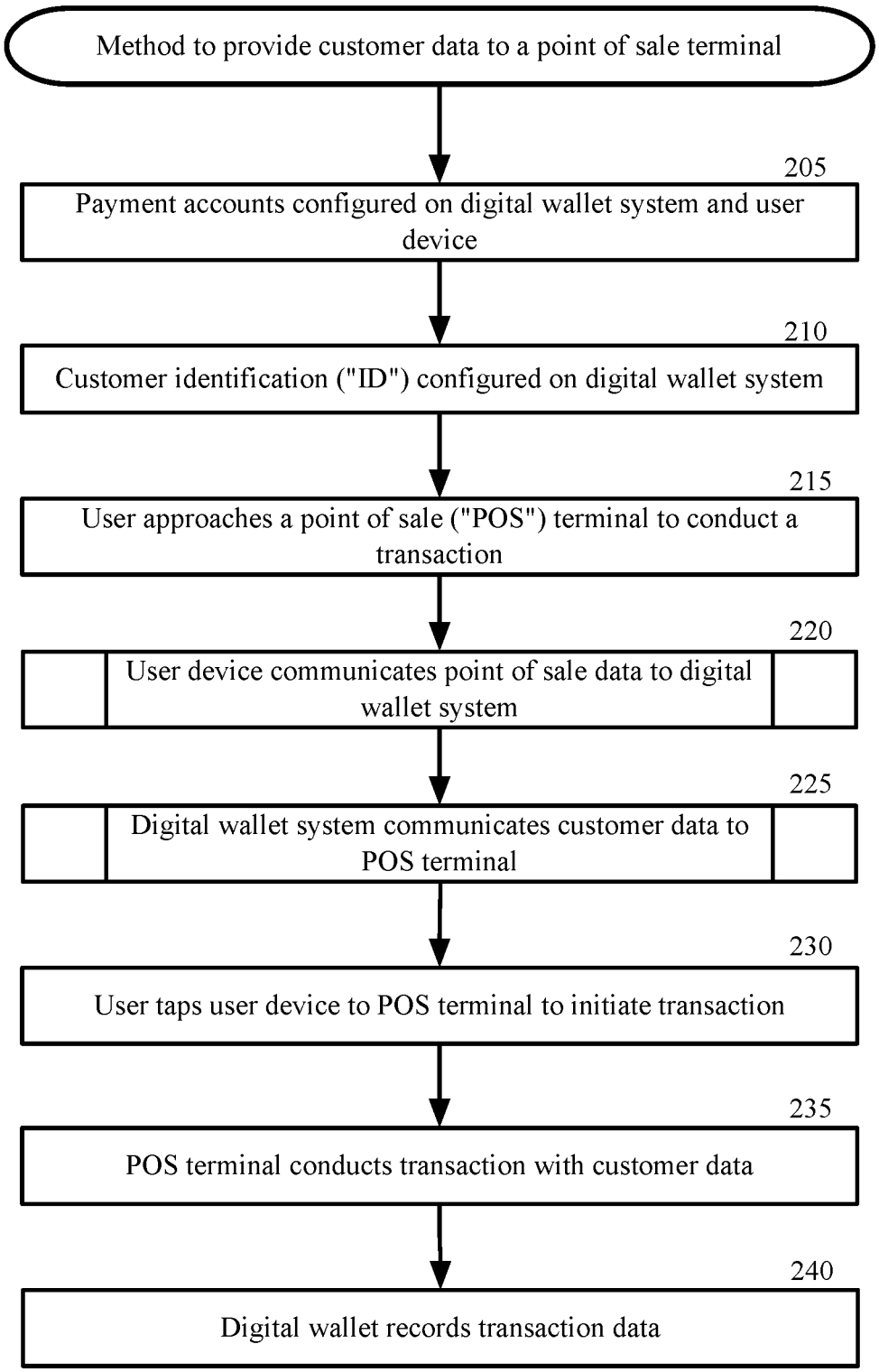
FIG. 2 is a block flow diagram depicting a method to provide customer data to a point of sale terminal, in accordance with certain example embodiments.
Figure 3:
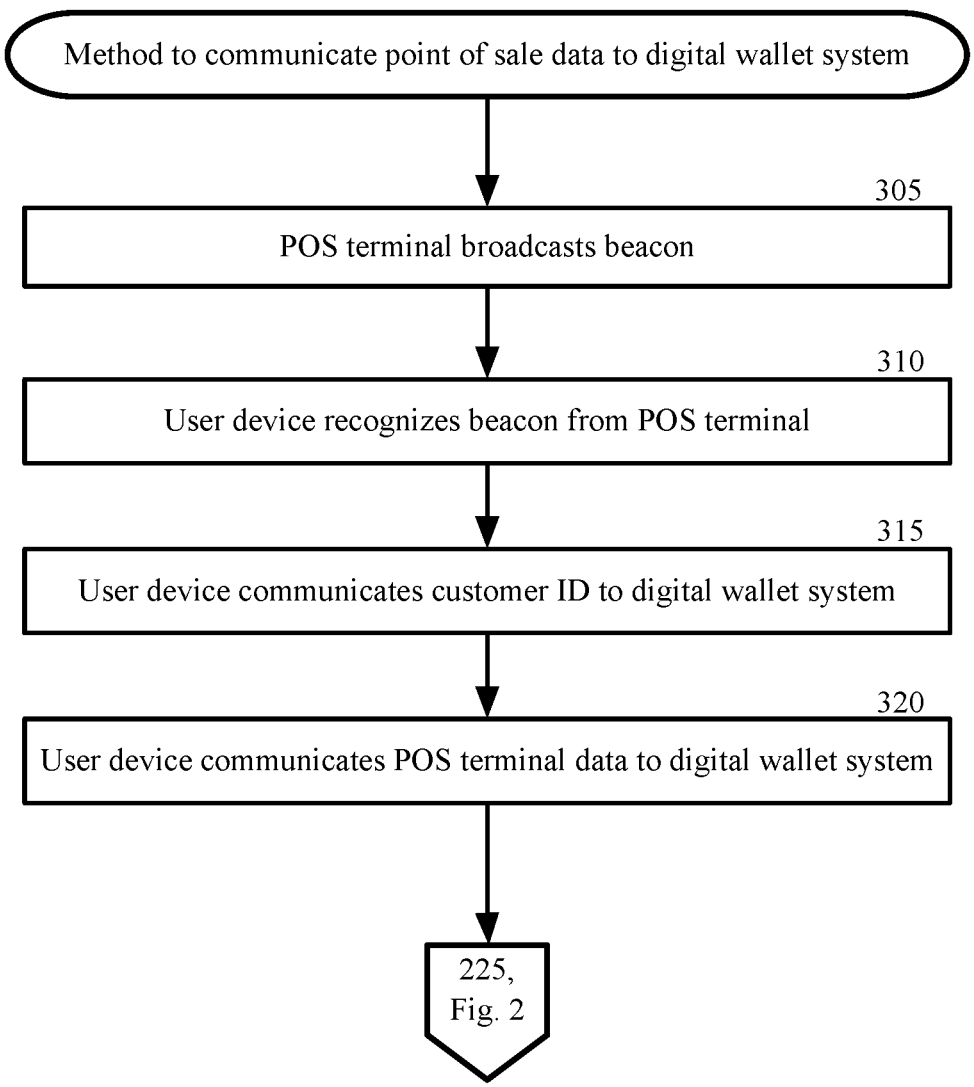
FIG. 3 is a block flow diagram depicting a method to communicate point of sale data to digital wallet system, in accordance with certain example embodiments.
Figure 4:
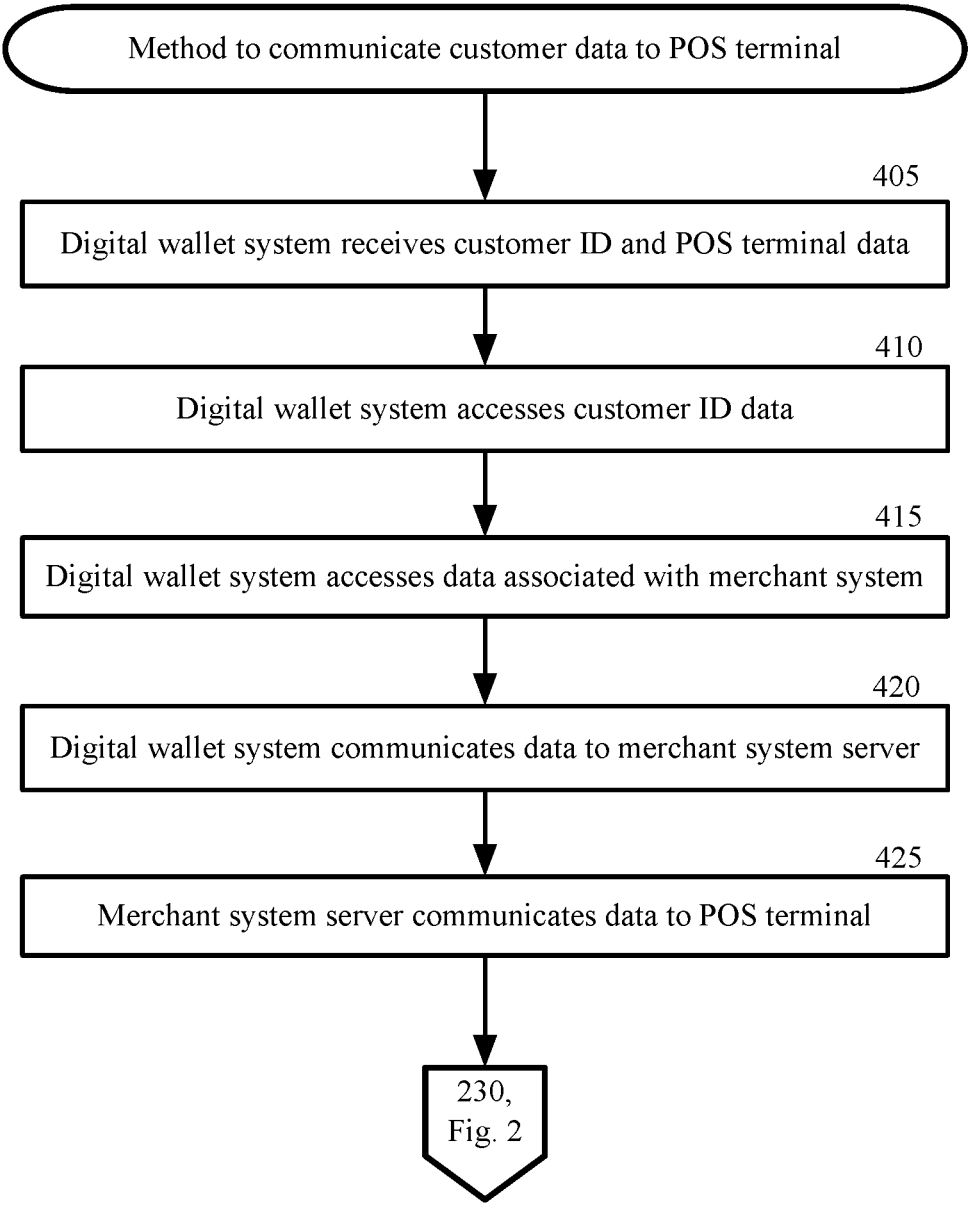
FIG. 4 is a block flow diagram depicting a method to communicate customer data to a point of sale terminal, in accordance with certain example embodiments.

The example methods illustrated in FIG. 2-4 are described hereinafter with respect to the components of the example operating environment 100. The example methods of FIG. 2-4 may also be performed with other systems and in other environments.

FIG. 2 is a block flow diagram depicting a method 200 to provide customer data to a point of sale terminal 132, in accordance with certain example embodiments.

With reference to FIGS. 1 and 2, in block 205, payment accounts are configured on a digital wallet system 140 and a user computing device 110. The user 101 associates one or more payment accounts with a digital wallet account of the user 101 on the digital wallet system 140. The digital wallet system 140 provides software to the user computing device 110 to install a digital wallet application 111 on the user computing device 110. The user 101 or the digital wallet system 140 may configure the digital wallet application 111 with the digital wallet data from the digital wallet system 140. In an example, the digital wallet account on the digital wallet system 140 and the digital wallet application 111 may be configured with one or more payment accounts of the user 101. The payment accounts may be credit card accounts, debit accounts, bank accounts, stored value accounts, or any other suitable payment accounts. The digital wallet account may be configured with loyalty information of the user 101 for one or more merchant systems 130. The digital wallet account may be configured with offers associated with the user 101 from merchant systems 130, manufacturers, or other systems.

In block 210, the customer ID is configured on the digital wallet system 140. The digital wallet system 140 associates a customer ID with the user account. In an example, the customer ID allows any system to identify the digital wallet account of the user 101 on the digital wallet system 140 or the digital wallet application 111. The customer ID may allow a requestor to identify loyalty data of the user 101, offers associated with the digital wallet account, or any other data associated with the digital wallet account that the user 101 allows. The user 101 may restrict access to the data in the account. For example, the user 101 may only allow certain merchant systems 130, card issuers, loyalty systems, or other parties to access certain customer data in the digital wallet account.

The customer ID may be selected by the user 101, the digital wallet system 140, or other system. Alternatively, the number may be a randomly generated number. The customer ID may be any combination of alphanumeric characters.

In block 215, a user 101 approaches a point of sale ("POS") terminal 132 to conduct a transaction. In an example, the POS terminal 132 is a cash register or other terminal at a physical location of a merchant system 130. For example, the user 101 visits the location and selects a product for purchase. The user 101 locates an open POS terminal 132 or waits in a line for a POS terminal 132 to become available.

In block 220, the user computing device 110 communicates point of sale data to the digital wallet system 140. The details of block 220 are described in greater detail with respect to method 220 of FIG. 3.

FIG. 3 is a block flow diagram depicting a method 220 to communicate point of sale data to the digital wallet system 140, in accordance with certain example embodiments.

In block 305, the POS terminal 132 broadcasts a beacon signal. The POS terminal 132 at a merchant system 130 location employs a beacon signal. The beacon signal may be any wireless broadcast of the identification of the POS terminal 132 and/or the merchant system 130. For example, the beacon signal may provided be any suitable technology that can be detected by the user computing device 110 and provide the appropriate information to the user computing device 110, such as near field communication ("NFC"), Bluetooth, Wi-Fi, Infrared, or any other suitable beacon signal technology. The beacon signal provides the appropriate information to the user computing device 110, such as an identification number of the POS terminal 132, a link to the server 135 of the merchant system 130, a lane number of the POS terminal 132, accepted forms of payment for the merchant system 130, a store location, or any other suitable data.

In an alternate example, the POS terminal 132 employs a separate device to broadcast the beacon signal. For example, an RFID transmitter may be located in an aisle approaching the POS terminal 132 to broadcast the beacon signal to the customers in the aisle.

In block 310, the user computing device 110 recognizes the beacon signal from the POS terminal 132. When a user approaches the POS terminal 132 to conduct a transaction, the user computing device 110 detects the beacon signal being transmitted from the POS terminal 132 or associated beacon device.

In an example, when the beacon signal is detected, the digital wallet application 111 on the user computing device 110 opens on the user interface of the user computing device 110. The digital wallet application 111 provides an indication to the user 101 that the beacon signal has been received and asks if the user 101 would like to proceed. If the user 101 elects to conduct the transaction with the identified POS terminal 132 using the customer ID, then the user 101 actuates a button or other object to instruct the digital wallet application 111 to proceed.

In an alternate example, the POS terminal 132 data may be obtained by the user computing device 110 from a QR code, or other machine readable code. In the example, the user 101 employs a camera or other module on the user computing device 110 to read a code that identifies the POS terminal 132 and provides any other suitable data. In another example, the user computing device 110 must tap the POS terminal 132 or an associated device to initiate the communication and to receive the POS terminal data 132.

In block 315, the user computing device 110 communicates the customer ID to digital wallet system 140. For example, the digital wallet application 111 on the user computing device 110 initiates a communication to the digital wallet system server 144 via an Internet connection over the network 105, a cellular connection, or any other suitable communication technology. The user computing device 110 communicates to the digital wallet system 140 the customer ID associated with the user account on the digital wallet system 140.

In block 320, the user computing device 110 communicates the data associated with the POS terminal 134 to digital wallet system 140. For example, all of the data received from the beacon signal in block 310 is communicated to the digital wallet system 140 concurrently with the customer ID from block 315. In another example, only certain information from the beacon signal is transmitted to the digital wallet system 140, such as the POS terminal ID.

From block 325, the method 220 returns to block 225 of FIG. 2.

Returning to FIG. 2, in block 225, the digital wallet system 140 communicates customer data to the POS terminal 132. The details of block 225 are described in greater detail with respect to method 225 of FIG. 4.

FIG. 4 is a block flow diagram depicting a method to communicate customer data to the POS terminal 132, in accordance with certain example embodiments.

In block 405, the digital wallet system 140 receives the POS terminal data, the customer ID, and any other suitable data from the user computing device. The digital wallet system 140 stores the received data and readies for a pending transaction.

In block 410, the digital wallet system 140 accesses the customer ID data. For example, the digital wallet system 140 accesses the loyalty data and offer data stored in the user account associated with the customer ID. The offer data may be associated with a list of products or manufacturers that have offers stored in the user account.

In block 415, the digital wallet system 140 identifies data that is associated with the merchant system 130 associated with the POS terminal ID. For example, if the user 101 has a loyalty account with the merchant system 130, then the digital wallet system 140 accesses the loyalty account number, offers associated with the loyalty account, or any other suitable data. The digital wallet system 140 may access the identity of the merchant system 130 associated with the POS terminal ID by comparing the received POS terminal ID to a database of POS terminal IDs and associated merchant system identifications.

In another example, the digital wallet system 140 identifies stored offers associated with the merchant system 130. The offers may be provided by the merchant system 130 or the offers may be manufacturer offers that are associated with the merchant system 130. Any other type of offers may be identified as potentially being relevant to the pending transaction.

In block 420, the digital wallet system 140 communicates the data to the merchant system server 135. The merchant system server 135 may be a server located at the merchant system 130 or in a remote location that is linked to the POS terminal 132 via the network 105 or in any suitable manner. The merchant system server 135 may represent a customer relationship management ("CRM") system.

In block 425, the merchant system server 135 receives the customer data and communicates the data to the POS terminal 132 at which the user 101 will be conducting the transaction. The merchant system server 135 identifies the POS terminal 132 which the user 101 will be conducting the transaction based on the POS terminal ID received from the digital wallet system 140. In an alternate example, the digital wallet system 140 communicates the data directly to the POS terminal 132. That is, the digital wallet system 140 may employ any suitable communication technology to communicate with the POS terminal 132 without routing the communication through the merchant server 135 or a CRM, such as an Internet connection via the network 105.

From block 425, the method 225 returns to block 230 of FIG. 2.

Returning to FIG. 2, in block 230, the user 101 taps the user computing device 110 to the POS terminal 132 to initiate a transaction. In an example, the user 101 swipes or taps the user computing device 110 on a POS terminal reader 134 that is logically connected to the POS terminal 132. In an example, the user 101 approaches the POS terminal 132 associated with the received beacon signal with one or more items for purchase. The user 101 swipes or taps the user computing device 110 and initiates a communication between the digital wallet application 111 on the user computing device 110 and the POS terminal 132. The tap may represent any action that is required to initiate a communication with the POS terminal 132. For example, the tap may require that the user 101 touch the user computing device 110 to a surface of a card reader 134 or the POS terminal 132. In another example, the tap may require that the user 101 hover the user computing device 110 near an antenna of a card reader 134. Any other type of tap, swipe, or other initiating actions, may be employed. The POS terminal 132 may employ a card reader 134 or other hardware or software to communicate wirelessly with the payment instrument 115 via NFC or other suitable technology or the POS terminal 132 may communicate with the user computing device 110 directly.

In block 235, the POS terminal 132 conducts the transaction with the customer data received from the user computing device 110 and from the digital wallet system 140. For example, the card reader 134 requests payment account information and other suitable data from the user computing device 110. The user computing device 110 assembles the necessary data for responding to the reader 134. The data may include the customer ID, a payment account number of the digital wallet account 111, and other suitable data. The user computing device 110 transmits the customer ID and other data to the reader 134 on the POS terminal 132. In certain example, the user computing device 110 only transmits the customer ID. In the example, any additional required information, such as the payment account number, user name, account expiration dates, or any other required data is obtained from the digital wallet system 140 based on the provided customer ID.

The card reader 134 provides the customer data to the POS terminal 132. The card reader 134 transmits the collected data to the POS terminal 132 via any available communication technology. For example, the card reader 134 may be a function of the POS terminal 132 and communicate the data via the processor of the POS terminal 132. In another example, the card reader 132 is connected to the POS terminal 132 via a hardwired connection. In another example, the card reader 132 communicates to the POS terminal 132 via a wireless connection. Any other suitable communication method may be employed.

The POS terminal 132 identifies customer loyalty data and offer data from the data received from the digital wallet system 140. In an example, the POS terminal 132 identifies the customer ID provided by the user computing device 110 and accesses the data received from the digital wallet system 140 that is associated with the customer ID.

The POS terminal 132 analyses the loyalty account data for the user 101 with the merchant system 130. For example, loyalty account information, such as reward levels, pending rewards, or other loyalty data may be accessed by the POS terminal 132 and applied to the transaction. Additionally, the POS terminal 132 identifies offer data received from the digital wallet system 140. For example, if the user 101 has one or more offers related to the merchant system 130 or a product being purchased, the POS terminal 132 identifies the offers. Any other useful data related to the digital wallet account may be accessed by the POS terminal 132 and utilized in the pending transaction.

The POS terminal 132 applies the loyalty and offer data to the transaction. For example, if the digital wallet account has stored a 20% off a transaction offer, then the POS terminal 132 may deduct 20% from the transaction total before requesting approval from a payment processing system. In another example, if the user 101 has an offer to "receive a free gift after 10 visits," then the POS terminal 132 may communicate to the digital wallet system 130 that the user 101 is conducting a "visit" and that the user 101 should receive the appropriate credit. In another example, the POS terminal 132 logs the total amount of the transaction and transmits the total to the digital wallet system 130 to allow the digital wallet system 130 to log the transaction total and apply a configured amount to reward points to the loyalty account of the user 101. Any other suitable action may be taken by the POS terminal 132.

The POS terminal 132 transmits an authorization request to a suitable payment processing system. The POS terminal 132 identifies the transaction total and provides an authorization request to a credit card network, a payment processing system, a banking institution, or any suitable system that will provide an authorization for the transaction and process the transaction. In the example, the digital wallet system 140 may function as the payment processing system and receive the request for an authorization of the transaction. In the example, the authorization is provided to the POS terminal 132 and the transaction is completed.

In block 240, the digital wallet application 111 and the digital wallet system 140 record the transaction data. The POS terminal 132 displays the authorization to the user 101 and/or a salesperson of the merchant system 130. The user 101 receives the purchased product or service and a paper or digital receipt for the transaction.

The digital wallet system 140 stores data associated with the conducted transaction to allow loyalty points to be accrued, offer data to be updated, or any other suitable action to be taken.

Example Systems

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a wearable computer, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read-only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A system to select payment accounts to transmit customer data to point of sale terminals, comprising:
   one or more storage devices; and
   one or more processors communicatively coupled to the one or more storage devices, wherein the one or more processors execute code instructions that are stored in the one or more storage devices to cause the one or more processors to:
      configure a customer identification associated with a digital wallet account;
      receive a communication from a user computing device, in response to the user computing device detecting a beacon signal associated with a merchant system terminal of a merchant system, the communication comprising the customer identification and terminal data associated with the merchant system terminal, the terminal data being determined form the beacon signal by the user computing device;
      identify a set of user data associated with the customer identification, the set of user data comprising at least one of user account data associated with the digital wallet system or loyalty data or offer data associated with the merchant system;
      communicate, to the merchant system, a notification comprising the set of user data to be applied to a subsequent transaction, the notification being communicated prior to an initiation of the subsequent transaction between the user computing device and the merchant system terminal; and
      receiving transaction data associated with a transaction conducted between the user computing device and the merchant system terminal using the set of user data.

2. The system of claim 1, further comprising code instructions to receive a request for an authorization of a pending transaction, the pending transaction being adjusted based on the set of user data.

3. The system of claim 2, further comprising code instructions to update the digital wallet account based on a set of data associated with the pending transaction.

4. The system of claim 3, further comprising code instructions to record a loyalty instance based on the pending transaction at the merchant system.

5. The system of claim 3, wherein the digital wallet account is updated with offer data.

6. The system of claim 1, wherein the set of user data is communicated to a server associated with the merchant system for communication to the point of sale terminal.

7. The system of claim 1, wherein:
the user computing device generates the communication without a required input from a user associated with the user computing device.

8. The system of claim 1, wherein the processor identifies the set of user data associated with the digital wallet account based at least in part on the identification of the point of sale terminal in the communication.

9. The system of claim 1, wherein:
the set of user data includes the customer identification, loyalty account data, and one or more offers.

10. The system of claim 9, wherein:
the user computing device provides the customer identification and a notification to the point of sale terminal to conduct the transaction; and
the set of user data is applied by the point of sale terminal based on associating the customer identification communicated by the processor with the customer identification provided by the user computing device.

11. The system of claim 10, wherein:
the point of sale terminal adjusts the transaction based on the set of user data.

12. A computer-implemented method, comprising:
receiving, by one or more computing devices of a digital wallet system, a communication from a user computing device in response to the user computing device detecting a beacon signal associated with a merchant system terminal of a merchant system, the communication comprising a customer identification and terminal data associated with the merchant system terminal, the terminal data being determined from the beacon signal by the user computing device;
identifying, by the one or more computing devices, a set of user data associated with the customer identification, the set of user data comprising at least one of user account data associated with the digital wallet system or loyalty data or offer data associated with the merchant system;
communicating, by the one or more computing devices, a notification comprising the set of user data to the merchant system to be applied to a subsequent transaction, the notification being communicated prior to an initiation of the subsequent transaction between the user computing device and the merchant system terminal; and
receiving, by the one or more computing devices, transaction data associated with a transaction conducted between the user computing device and the merchant system terminal using the set of user data.

13. The computer-implemented method of claim 12, wherein:
the user computing device generates the communication without a required input from a user associated with the user computing device.

14. The computer-implemented method of claim 12, wherein said communicating the set of user data comprises:
communicating, to the merchant system, the set of user data based at least in part on the identification of the merchant system terminal communicated in the beacon signal.

15. One or more non-transitory computer-readable storage media that store instructions that, when executed by one or more processors, cause the one or more processors to perform operations, the operations comprising:
receiving, by a digital wallet system, a communication from a user computing device in response to the user computing device detecting a beacon signal associated with a merchant system terminal of a merchant system, the communication comprising a customer identification and terminal data associated with the merchant system terminal, the terminal data being determined from the beacon signal by the user computing device;
identifying a set of user data associated with the customer identification, the set of user data comprising at least one of user account data associated with the digital wallet system or loyalty data or offer data associated with the merchant system;
communicating a notification comprising the set of user data to the merchant system to be applied to a subsequent transaction, the notification being communicated prior to an initiation of the subsequent transaction between the user computing device and the merchant system terminal; and
receiving transaction data associated with a transaction conducted between the user computing device and the merchant system terminal using the set of user data.

16. The one or more non-transitory computer-readable storage media of claim 15, wherein:
the user computing device generates the communication without a required input from a user associated with the user computing device.

* * * * *